(12) United States Patent
Ohtomo

(10) Patent No.: US 9,329,419 B2
(45) Date of Patent: May 3, 2016

(54) IMAGE DISPLAY APPARATUS

(71) Applicant: CANON KABUSHIKI KAISHA, Tokyo (JP)

(72) Inventor: Ryo Ohtomo, Chigasaki (JP)

(73) Assignee: Canon Kabushiki Kaisha, Toyko (JP)

(*) Notice: Subject to any disclaimer, the term of this patent is extended or adjusted under 35 U.S.C. 154(b) by 65 days.

(21) Appl. No.: 14/183,764

(22) Filed: Feb. 19, 2014

(65) Prior Publication Data

US 2014/0233203 A1 Aug. 21, 2014

(30) Foreign Application Priority Data

Feb. 19, 2013 (JP) ................................ 2013-030157
Feb. 13, 2014 (JP) ................................ 2014-025663

(51) Int. Cl.
*G06F 1/16* (2006.01)
*G02F 1/1333* (2006.01)
*H05K 5/00* (2006.01)
*H05K 7/00* (2006.01)

(52) U.S. Cl.
CPC ...... *G02F 1/133308* (2013.01); *G02F 2201/54* (2013.01)

(58) Field of Classification Search
CPC .............. G06F 1/16; G06F 1/1601–1/1611; G06F 1/1613–1/1698; G06F 1/18–1/189; H05K 5/00–5/069; H05K 7/00–7/186
USPC ............. 361/679.01–679.45, 679.55–679.61, 361/724–727, 679.55–679.56, 728–730, 361/741, 748–752, 756, 686, 687, 688, 696, 361/697, 787, 789, 794, 701–703, 709, 361/807–810; 455/575.1–575.9; 349/56–60; 312/223.1–223.3
See application file for complete search history.

(56) References Cited

U.S. PATENT DOCUMENTS

| 6,104,451 | A  | * | 8/2000  | Matsuoka | ......... G02F 1/133308 349/58 |
| 6,504,713 | B1 | * | 1/2003  | Pandolfi | .............. G02F 1/13338 345/87 |
| 7,379,128 | B2 |   | 5/2008  | Tsubokura et al. | |
| 7,889,287 | B2 |   | 2/2011  | Tsubokura et al. | |
| 7,935,892 | B2 | * | 5/2011  | Nishikawa | ................ C09J 9/02 174/255 |
| 8,054,401 | B2 |   | 11/2011 | Tsubokura et al. | |
| 8,242,681 | B2 |   | 8/2012  | Tagawa et al. | |

(Continued)

FOREIGN PATENT DOCUMENTS

| JP | 07-244274 A | 9/1995 |
| JP | 2005-091668 A | 4/2005 |

(Continued)

*Primary Examiner* — Anthony Haughton
*Assistant Examiner* — Razmeen Gafur
(74) *Attorney, Agent, or Firm* — Fitzpatrick, Cella, Harper & Scinto

(57) ABSTRACT

The image display apparatus includes a display panel, a holding member that holds four sides of the display panel, and a cushioning member that is disposed between the display panel and the holding member and exerts pressing force corresponding to deformation amount on the display panel. In a state where the warp present in the display panel is smaller than the warp in its maximum warp state, the pressing force exerted on the display panel from the cushioning member in a region at each of both end portions of at least one of the four sides of the display panel is smaller than the pressing force exerted on the display panel from the cushioning member in a region at a central portion of the side.

27 Claims, 18 Drawing Sheets

(56) References Cited

U.S. PATENT DOCUMENTS

| | | | |
|---|---|---|---|
| 8,350,458 B2 | 1/2013 | Ohtomo et al. | |
| 2005/0057703 A1 | 3/2005 | Tsubokura et al. | |
| 2008/0225199 A1 | 9/2008 | Tsubokura et al. | |
| 2008/0285222 A1* | 11/2008 | Yeo | H05K 9/0022 361/679.46 |
| 2010/0014272 A1* | 1/2010 | Horie | G06F 1/16 361/829 |
| 2010/0288524 A1 | 11/2010 | Tagawa et al. | |
| 2010/0289401 A1 | 11/2010 | Ohtomo et al. | |
| 2011/0122335 A1 | 5/2011 | Tsubokura et al. | |
| 2011/0164370 A1* | 7/2011 | McClure | G06F 1/1613 361/679.26 |
| 2011/0164372 A1* | 7/2011 | McClure | G06F 1/1613 361/679.26 |
| 2011/0216492 A1* | 9/2011 | Murakata | G06F 1/16 361/679.08 |
| 2011/0267551 A1* | 11/2011 | Yokote | G06F 1/1643 348/836 |
| 2011/0279948 A1* | 11/2011 | Morita | G06F 1/1616 361/679.01 |
| 2011/0285647 A1* | 11/2011 | Imamura | G06F 1/1616 345/173 |
| 2011/0285652 A1* | 11/2011 | Imamura | G06F 1/1616 345/173 |
| 2011/0310545 A1* | 12/2011 | Liu | G02F 1/133308 361/679.01 |
| 2012/0063113 A1* | 3/2012 | Hisakawa | G02F 1/133308 361/807 |
| 2012/0162892 A1* | 6/2012 | Hirai | G06F 1/1681 361/679.28 |
| 2012/0170179 A1* | 7/2012 | Aumiller | G06F 1/1637 361/679.01 |
| 2012/0182700 A1* | 7/2012 | Byeon | G02F 1/133308 361/749 |
| 2012/0194998 A1* | 8/2012 | McClure | H01Q 1/243 361/679.56 |
| 2012/0218696 A1* | 8/2012 | Kim | G02F 1/133308 361/679.01 |
| 2012/0250276 A1* | 10/2012 | Nakajima | G06F 1/1626 361/752 |
| 2012/0250292 A1* | 10/2012 | Michimori | G02F 1/133308 362/97.1 |
| 2012/0262855 A1* | 10/2012 | Park | G02F 1/133308 361/679.01 |
| 2012/0262907 A1* | 10/2012 | Lee | H05K 5/02 362/97.1 |
| 2012/0268868 A1* | 10/2012 | Yoon | G02F 1/133308 361/679.01 |
| 2012/0293960 A1* | 11/2012 | Takashima | G02F 1/133308 361/707 |

FOREIGN PATENT DOCUMENTS

| | | |
|---|---|---|
| JP | 2009-092716 A | 4/2009 |
| JP | 2010-204357 A | 9/2010 |

* cited by examiner

IMAGE DISPLAY APPARATUS

BACKGROUND OF THE INVENTION

1. Field of the Invention

The present invention relates to an image display apparatus.

2. Description of the Related Art

In liquid crystal and organic electroluminescence (EL) display panels, display elements such as liquid crystal and organic light-emitting elements are provided between two glass substrates formed with thin film devices.

A conventional structure will be described with reference to FIGS. 15 and 16. An image display apparatus 1 having a display panel 20 is configured such that a metal case 70 in which the display panel 20 is accommodated or bonded and a base 75 are disposed on the opposite side of a display surface, and the side of the display surface is covered with a metal frame 10. The display panel 20 is a liquid crystal display panel. The image display apparatus 1 includes the display panel 20, a backlight unit for illuminating the display panel 20, and optical sheets for condensing light from the backlight unit.

The optical sheets 40 and the backlight unit are normally disposed in this order on the back of the liquid crystal display panel. The backlight unit includes a substrate 60, light sources 61, and a reflection sheet 50. Normally, for the purpose of maintaining a specific space from the optical sheets 40 and holding the liquid crystal display panel, a resin panel holder 30 is disposed so as to cover the circumference and the back surface. In addition, the liquid crystal display panel is held between a frame 10 disposed on the front and the panel holder 30 via a front elastic body 31 and a back elastic body 32 such as cushions.

On the other hand, when stress concentration occurs on the display surface of the display panel, brightness uniformity and chromaticity uniformity are locally lowered. This is called display unevenness. For example, in the case of the liquid crystal display panel, the orientation of the liquid crystal is forcibly disturbed by reception of the stress, and voltage application control ceases to function so that display unevenness 90 occurs. An example of the display unevenness 90 is shown in FIG. 15.

Japanese Patent Application Laid-open No. 2010-204357 describes a structure in which a stress at the lower end portion of the display panel is temporarily reduced. In addition, Japanese Patent Application Laid-open No. 2009-92716 describes a structure that lessens the stress applied to the display panel caused by changes in temperature.

SUMMARY OF THE INVENTION

However, the related art and the image display apparatus of Japanese Patent Application Laid-open No. 2010-204357 sometimes have not been able to cope with changes in use environment. When the use environment, e.g., an ambient temperature or humidity is changed, there are cases where warps occur at the four corners of the display panel 20. The warps occur due to properties of polarizing plates bonded to the front and back surfaces of the display panel 20. A difference in expansion coefficient or contraction coefficient between the polarizing plates on the front and back surfaces and a difference in expansion direction or contraction direction therebetween cause the warp to occur in the display panel 20. In addition, a difference in thermal expansion resulting from a difference in temperature between the front surface and the back surface of the display panel 20 also causes the warp to occur.

A state where the warp is present in the display panel will be described with reference to FIG. 17. Warps 15 occur at the four corners of the upper and lower sides. With this, the compression ratio and compression force of the front elastic body 31 are increased, stress concentration becomes likely to occur on the display panel 20, and the display unevenness occurs.

In addition, in Japanese Patent Application Laid-open No. 2009-92716, since materials having different physical properties are used in a thickness direction, the display panel sometimes has been shifted from the optimum position in the thickness direction of the display panel. With this, a panel holding force is reduced, and the deformation amount of the display panel and the stress of the display panel are increased when an external force is applied to the surface of the liquid crystal panel so that the display unevenness is likely to occur.

The present invention provides a technology capable of reducing the display unevenness even in a case where the warp occurs in or the external force is exerted on the display panel of the image display apparatus.

The present invention is an image display apparatus including a display panel, a holding member that holds four sides of the display panel, and a cushioning member that is disposed between the display panel and the holding member and exerts pressing force corresponding to deformation amount on the display panel, wherein the pressing force exerted on the display panel from the cushioning member in a region at each of both end portions of at least one of the four sides of the display panel is smaller than the pressing force exerted on the display panel from the cushioning member in a region at a central portion of the side in a state where a warp present in the display panel is smaller than the warp in its maximum warp state.

According to the present invention, it is possible to reduce the display unevenness even in the case where the warp occurs in or the external force is exerted on the display panel of the image display apparatus.

Further features of the present invention will become apparent from the following description of exemplary embodiments with reference to the attached drawings.

DESCRIPTION OF THE EMBODIMENTS

First Embodiment

Hereinbelow, a first embodiment according to the present invention will be described with reference to the drawings.

Figure 1:
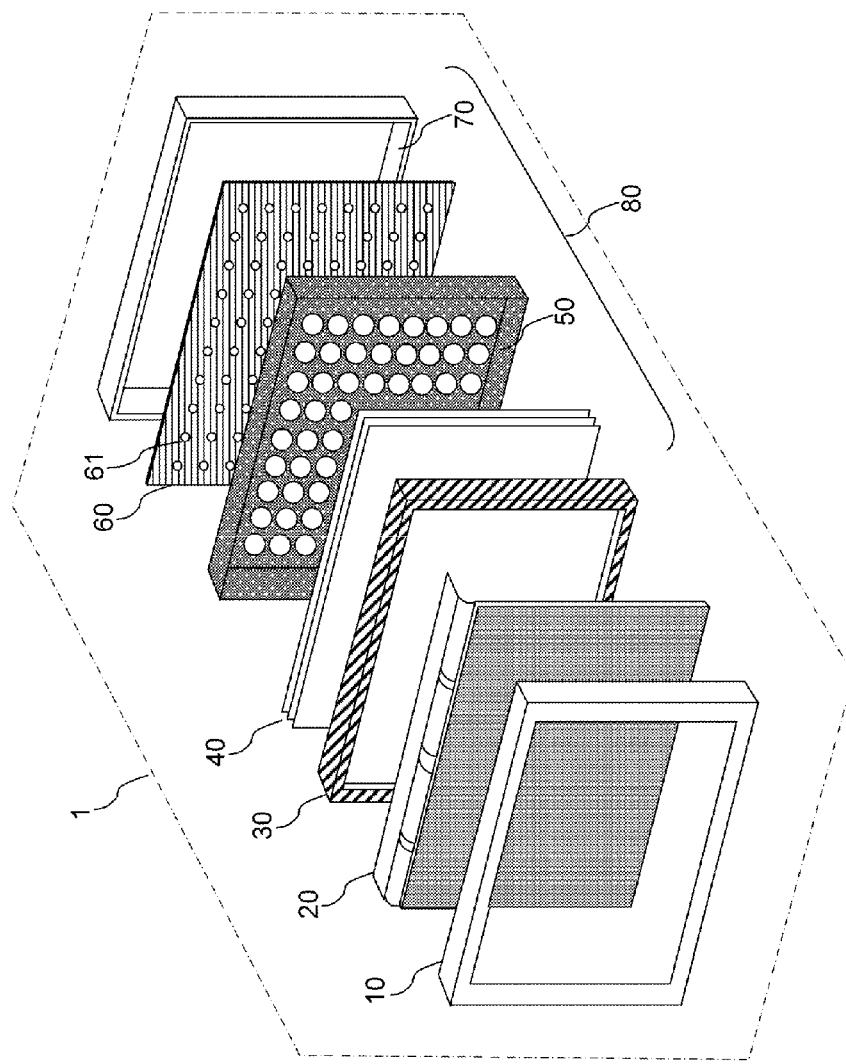
FIG. 1 is an exploded perspective view schematically showing the entire image display apparatus of a first embodiment.

FIG. 1 is an exploded perspective view schematically showing the entire image display apparatus according to the first embodiment. An image display apparatus 1 includes a frame 10, a display panel 20, a panel holder 30, optical sheets 40, a reflection sheet 50, a substrate 60, and a case 70. The frame 10 is a holding member that holds four sides of the display panel 20, and metal is often used as the material of the frame 10. The frame 10 is formed by press working or machining, but may also be formed by resin molding. The panel holder 30 is preferably formed by resin molding, but may also be formed of a metal material. The panel holder 30 holds and accommodates the display panel 20 so as to maintain a specific space from the optical sheets 40.

The optical sheets 40 diffuse light from a backlight unit 80. The reflection sheet 50 reflects light of light sources. On the substrate 60, light sources 61 such as a light emitting diode (LED) and a cold cathode fluorescent lamp (CCFL) are implemented. Examples of the backlight system include direct type and edge light type, and the configuration of the present invention is preferable for both of the types. The case 70 accommodates the optical sheets 40, the reflection sheet 50, and the substrate 60. The backlight unit 80 includes the panel holder 30, the optical sheets 40, the reflection sheet 50, the substrate 60, and the case 70, and the display panel 20 is illuminated by the backlight unit 80.

Figure 2:
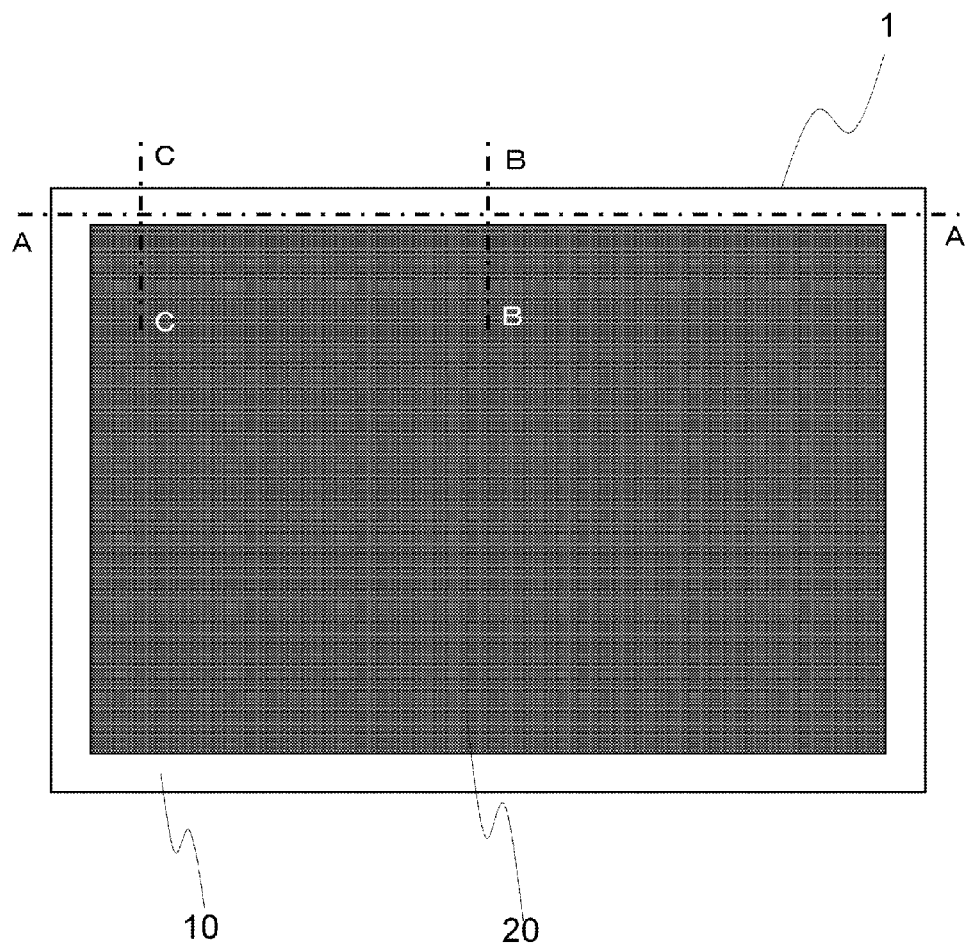
FIG. 2 is a front view schematically showing the image display apparatus of the first embodiment.
Figure 3:
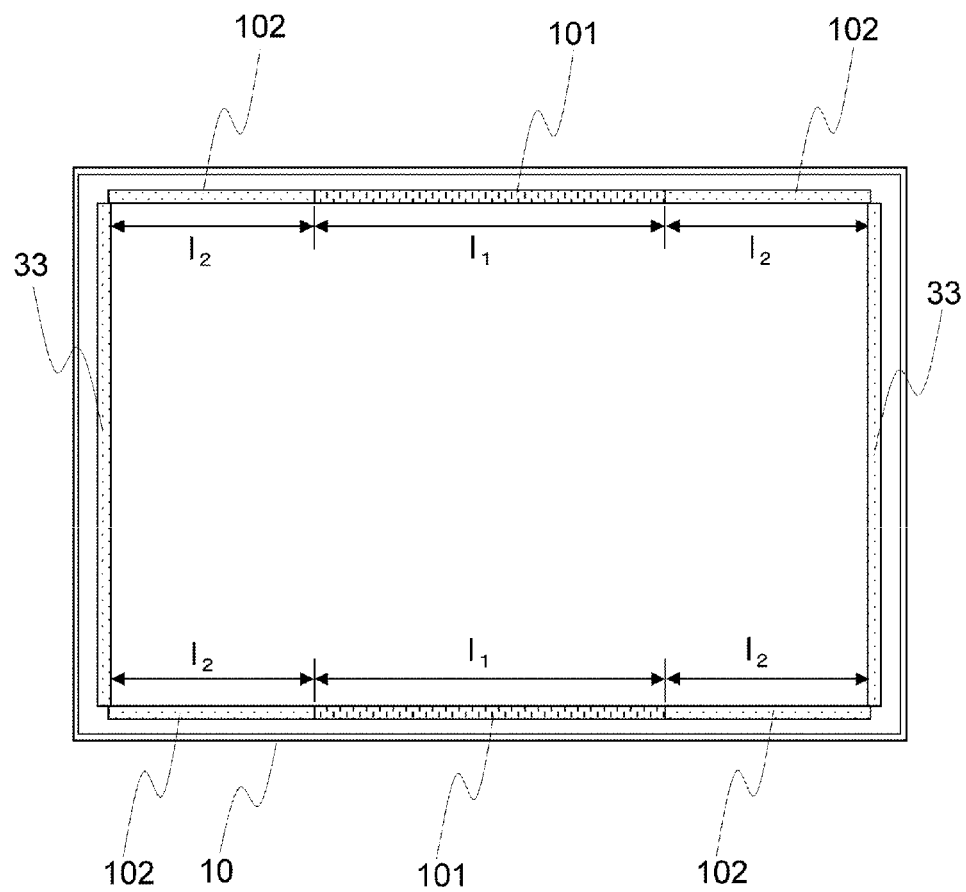
FIG. 3 is a view schematically showing the disposition of a front elastic body on the side of a back surface of a frame of the first embodiment.
Figure 4:
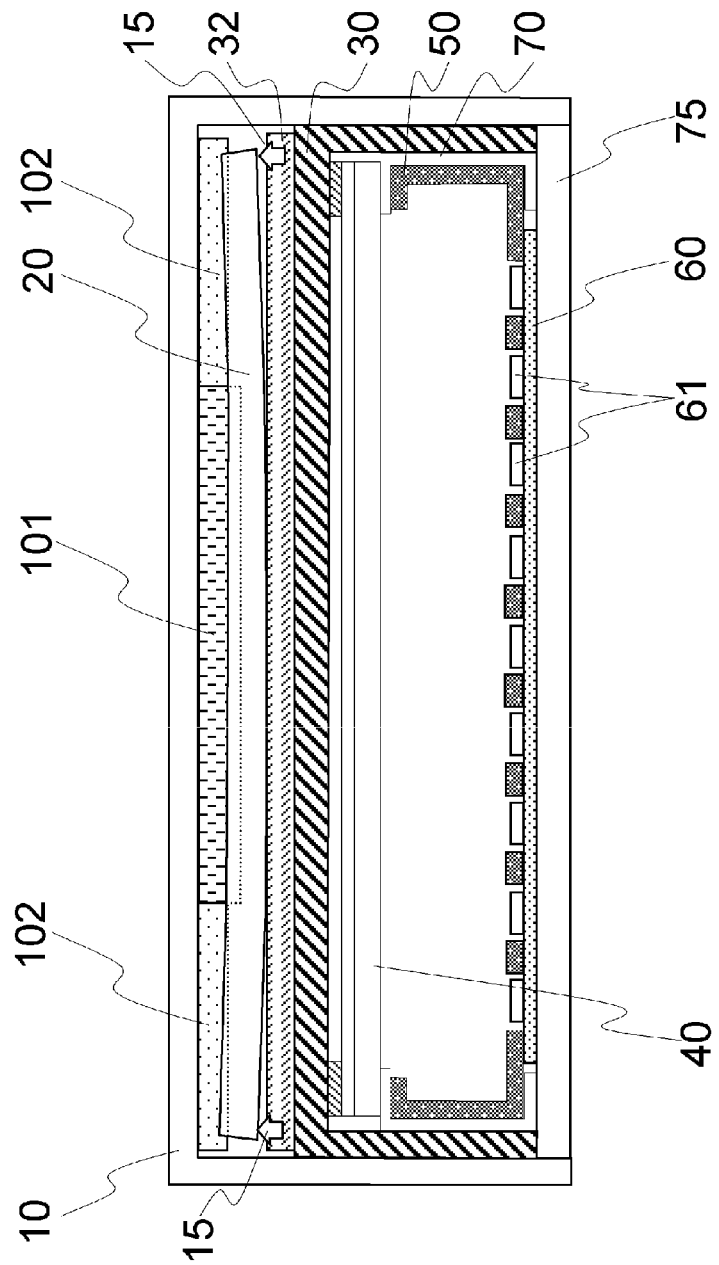
FIG. 4 is an A-A cross-sectional view of FIG. 2 schematically showing an upper side of the image display apparatus of the first embodiment.
Figure 5:
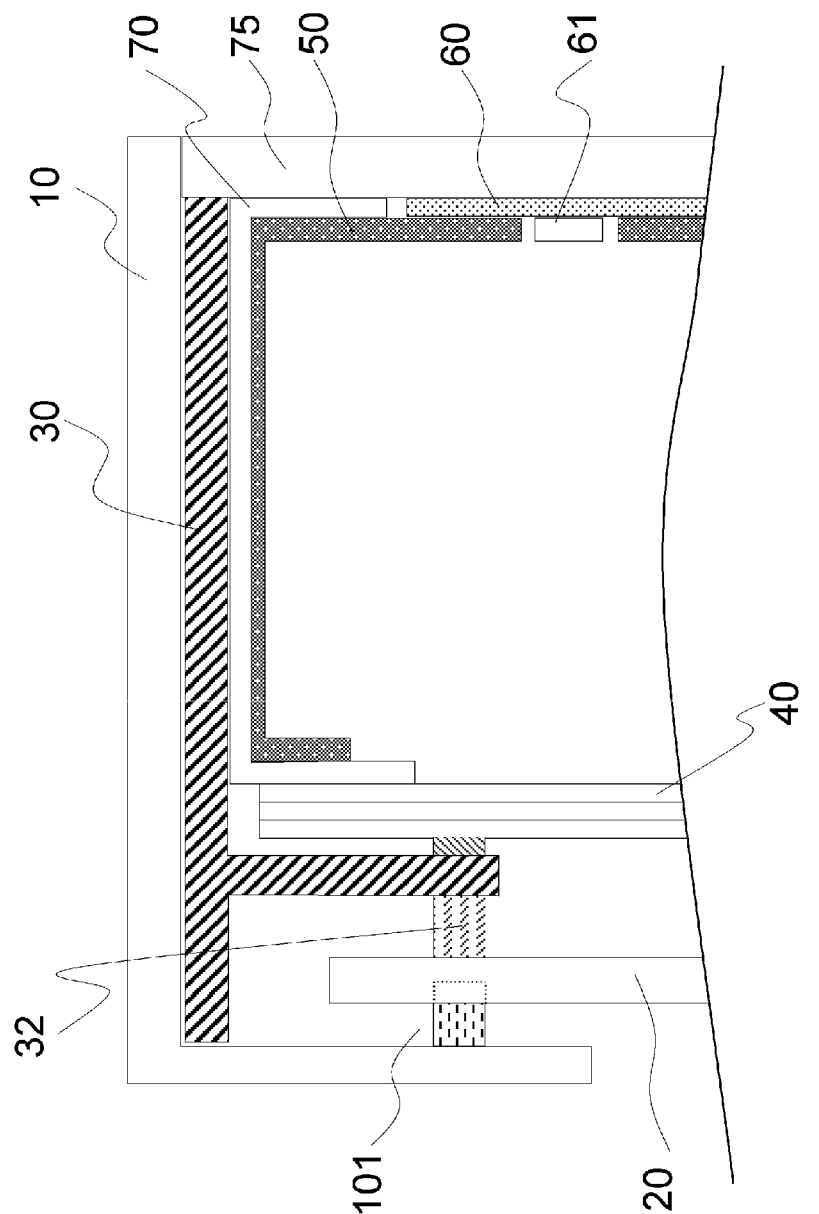
FIG. 5 is a B-B cross-sectional view of FIG. 2 showing a central portion of the upper side of the image display apparatus of the first embodiment.
Figure 6:
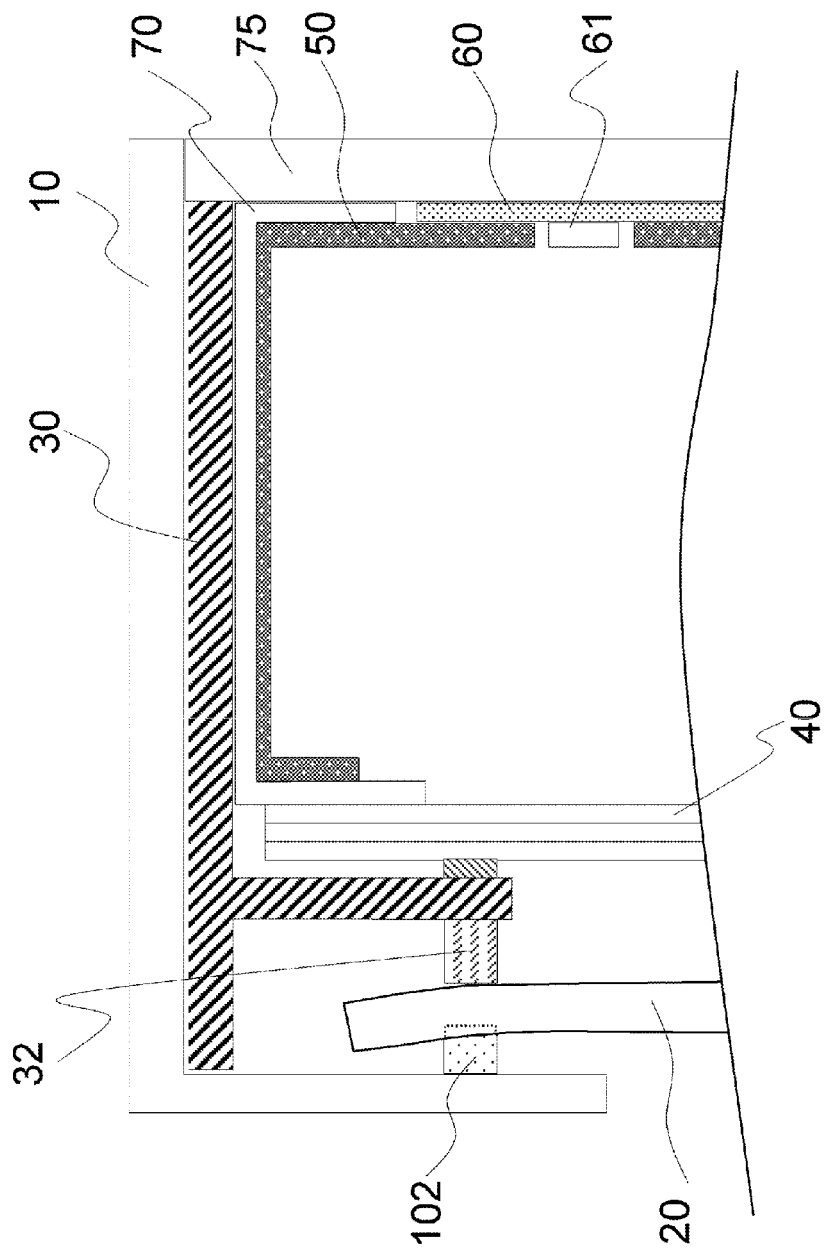
FIG. 6 is a C-C cross-sectional view of FIG. 2 showing a both end portion of the upper side of the image display apparatus of the first embodiment.

FIG. 2 is a front view schematically showing the image display apparatus according to the first embodiment. FIG. 3 is a view schematically showing the disposition of a front elastic body on the side of the back surface of the frame according to the first embodiment. FIG. 4 is an A-A cross-sectional view of FIG. 2 schematically showing an upper side of the image display apparatus according to the first embodiment of the present invention. FIG. 5 is a B-B cross-sectional view of FIG. 2 schematically showing a central portion of the upper side of the image display apparatus according to the first embodiment. FIG. 6 is a C-C cross-sectional view of FIG. 2 schematically showing a both end portion of the upper side of the image display apparatus according to the first embodiment.

As shown in FIG. 2, the frame 10 is disposed so as to cover four sides on the outer periphery of the front surface of the display panel 20. The front elastic bodies as cushioning members that are disposed between the display panel 20 and the frame 10 and hold the display panel 20 are disposed at four sides on the side of the back surface of the frame 10 (side opposing the side of the front surface of the display panel 20) when the display panel 20 is incorporated into the image display apparatus 1. In addition, back elastic bodies as cushioning members that are disposed between the display panel 20 and the panel holder 30 and hold the display panel 20 are disposed. As the material of the front elastic body and the back elastic body, a material having flexibility is preferably used such that the display panel 20 is not scratched or bruised. Though depending on the clearance between the frame 10 and the display panel 20, the thickness of the front elastic body is preferably about 0.5 to 5 mm, and the width thereof is preferably about 0.5 to 5 mm. The thickness of the back elastic body is also preferably about 0.5 to 5 mm, and the width thereof is preferably about 0.5 to 5 mm. With regard to the hardness of each of the front elastic body and the back elastic body, it is better for the back elastic body to have the hardness not less than that of the front elastic body. This is for maintaining the space between the display panel 20 and the optical sheets 40 at a specific value. Although the back elastic body is bonded to the panel holder 30 and the front elastic body is bonded to the frame 10, they may not be bonded thereto. The elastic bodies are compressed and a compression force generated according to the deformation amount by the compression is exerted on the display panel 20, whereby the display panel 20 is held. As shown in FIG. 3, in the first embodiment, front elastic bodies (central portions) 101 and front elastic bodies (both end portions) 102 are disposed at upper and lower sides (long sides). Front elastic bodies (side portions) 33 are disposed at left and right sides (short sides). As shown in FIG. 4, the configuration is effective at suppressing display unevenness in a case where warps 15 occur at the four corners of the display panel 20 at the upper and lower sides of the image display apparatus 1, and the four corners are moved to the side of the front surface by the warps. There are various causes for the occurrence of the warp in the display panel 20, and typical examples of the cause therefor include changes in the temperature of the display panel 20 due to environmental conditions (ambient temperature and humidity) and use conditions (use time and the like). The direction, amount, and shape of the warp are changed according to the thickness and size of the display panel 20 and the thicknesses and properties of polarizing plates bonded to the front surface and the back surface of the display panel 20.

The compression ratio and the compression force of the front elastic body are increased in the both end portions (regions at both end portions of the side) in the longitudinal direction of the display panel 20 due to the warps 15, stress concentration becomes likely to occur on the display panel 20, and the display unevenness becomes likely to occur. To cope with this, in the first embodiment, the thickness of the front elastic body (both end portion) 102 is smaller than that of the front elastic body (central portion) 101, and the pressing force by the front elastic body in the both end portion is made smaller than the pressing force by the front elastic body in the central portion in the longitudinal direction of the display panel. With this, even when the warp occurs in the both end portion in the longitudinal direction of the display panel and the both end portion of the display panel is moved to the side of the front surface, it is possible to prevent the pressing force by the front elastic body from becoming extremely large in the both end portion.

The details of the front elastic body and the pressing force will be described with reference to FIGS. 5 and 6. The warp of the display panel 20 is hardly seen in the central portion in the longitudinal direction of the image display apparatus, but there are cases where a large warp occurs in the both end portion. With this, when the front elastic body is disposed in the longitudinal direction with the same thickness, in a case where the warp occurs in the display panel 20, the compression ratio in the central portion is not significantly changed, but the compression ratio in the both end portion is increased. Accordingly, the front elastic body (central portion) 101 is made thicker than that in the both end portion and the compression ratio and the compression force are thereby made uniform, and the front elastic body (both end portion) 102 is made thinner than that in the central portion while maintaining the holding force of the display panel 20 and the compression ratio and the compression force before the occurrence of the warp are thereby reduced. With this, it is possible to lessen the stress generated in the display panel when the warp occurs to reduce the display unevenness. In addition, an example of the effect obtained by maintaining the uniform compression force in the central portion includes a reduction in display unevenness caused by an external force. When the display panel 20 is pressurized from the front surface by the external force, there are cases where the display panel 20 is locally deformed and the display unevenness is thereby caused to occur. The display unevenness tends to depend on the amount of deformation of the display panel 20 caused by the pressurization. Consequently, it is necessary to exert a uniform holding force on the display panel 20 such that the deformation amount by the external force is not increased.

Herein, a method for calculating the compression ratio of the front elastic body is shown below.

$$\text{Compression Ratio (\%)} = \frac{\text{Compression Amount of Front Elastic Body (mm)}}{\text{Thickness of Front Elastic Body (mm)}} \times 100 \quad \text{[Numerical Expression 1]}$$

Figure 7:
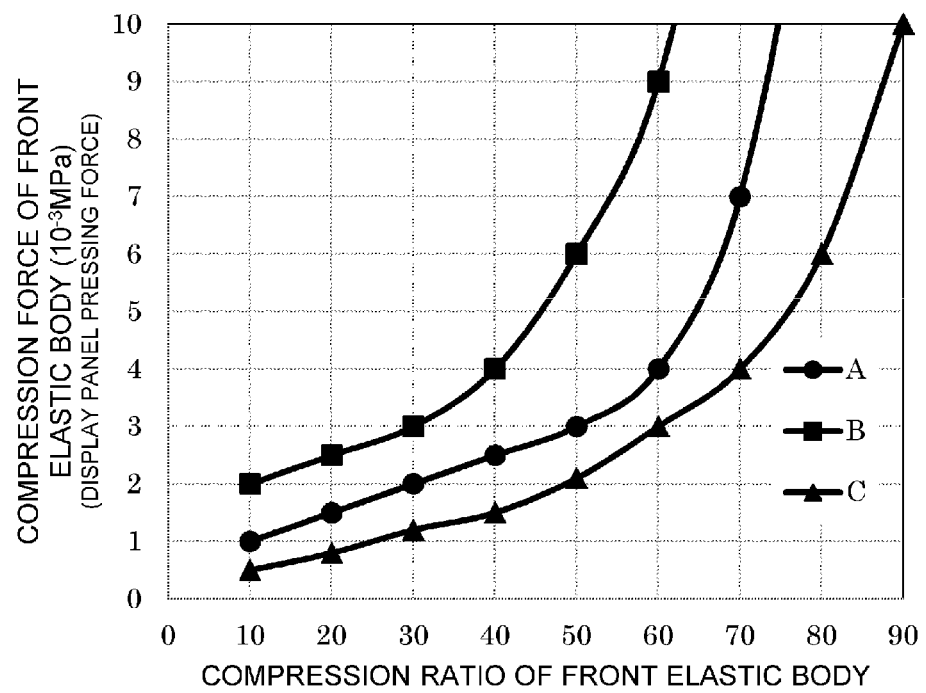
FIG. 7 is a view showing the relationship among the compression ratio of the front elastic body, the compression force of the front elastic body, and a pressing force to a display panel.

Next, the relationship among the compression ratio and the compression force of the front elastic body and the pressing force to the display panel will be described. FIG. 7 shows graphs showing an example of the relationship among the compression ratio of the front elastic body, the compression force of the front elastic body, and the pressing force to the display panel in the image display apparatus according to the first embodiment.

In FIG. 7, graphs A, B, and C indicate different properties of the front elastic bodies A, B, and C. Though the properties change depending on the material, the tendency in which the compression force is increased when the compression ratio of the front elastic body is increased is common to the front elastic bodies A, B, and C. In addition, in the cushioning material such as the elastic body, the compression force tends to be sharply increased as the compression ratio is increased. Consequently, the choice of the proper compression ratio of the front elastic body and the choice of physical properties (materials, elastic properties, and the like) thereof are important. Since the front elastic body is in contact with the display panel, the compression force of the front elastic body is considered to be equal to the pressing force to the display panel. Although the pressing force is generated on the entire periphery of the display panel, the magnitude of the pressing force depends on the warp and the held position of the display panel so that the pressing force is not uniform over the entire periphery thereof. In addition, when the pressing force is increased to the magnitude that causes the stress influencing the display to occur in the display panel, the display unevenness occurs. For example, when the chosen material of the front elastic body is represented by a material A and the display unevenness generation stress is represented by $3 \times 10^{-3}$ MPa, it is necessary to suppress the compression ratio of the front elastic body to not more than 50% in the cross sections shown in FIGS. 5 and 6. For example, the initial compression ratio in the central portion is assumed to be 30 to 40%. On the other hand, the warp needs to be considered, and hence the initial compression ratio in the both end portion is preferably about 10 to 30%. Further, by considering the compression ratio that sharply increases the compression force, an appropriate margin can also be set. For this setting, although it is necessary to calculate the maximum warp amount that can be generated in advance, it becomes possible to set the compression ratio that does not influence the display even when the warp occurs. Lengths $l_1$ and $l_2$ of the front elastic body (central portion) 101 and the front elastic body (both end portion) 102 shown in FIG. 3 are determined according to the compression ratio and the amount and the shape of the warp. Note that, as shown in FIG. 7, the relationship between the compression ratio and the compression force differs according to the materials (A, B, and C) of the front elastic body, and the stress, the warp amount, and the warp shape that influence the display differ according to a difference in the type of the display panel. Consequently, by appropriately setting the lengths $l_1$ and $l_2$ of the front elastic body (central portion) and the front elastic body (both end portion) according to the material of the front elastic body and specifications of the display panel used in the image display apparatus to which the present invention is applied, it is possible to reduce the display unevenness. In the first embodiment, the front elastic body (central portion) 101 is formed to be thick, the front elastic body (both end portion) 102 is formed to be thin, and the pressing force is thereby changed.

Further, by using B as the material of the front elastic body (central portion) 101 and using C as the material of the front elastic body (both end portion) 102 on the basis of the properties of the materials, it is possible to make the pressing force in the both end portion different from that in the central portion even when the thickness is set to the same value in the both end portion and in the central portion. The pressing force applied to the display panel in the both end portion is prevented from becoming larger than the pressing force in the central portion when the warp occurs in the display panel, and it is thereby possible to prevent the occurrence of the stress that causes the display unevenness in the both end portion of the display panel when the warp occurs. Therefore, it is possible to suppress the occurrence of the display unevenness.

The shape of the warp of the display panel differs according to the material, the thickness, and the shape of the display panel, the material, the thickness of the polarizing plates, and the compression ratio of the elastic body. For example, an appropriate range of the compression ratio of the front elastic body (central portion) may be around 40% (for example 40±10%) based on the balance between the holding force of the panel holder to hold the display panel and the display unevenness. The length of the front elastic body (both end portion) and the front elastic body (central portion) with which the display unevenness generated on the display panel is at the allowable level differs according to the characteristics of the display panel. However, the following tendency was found by intensive studies made by the inventors.

Figure 18:
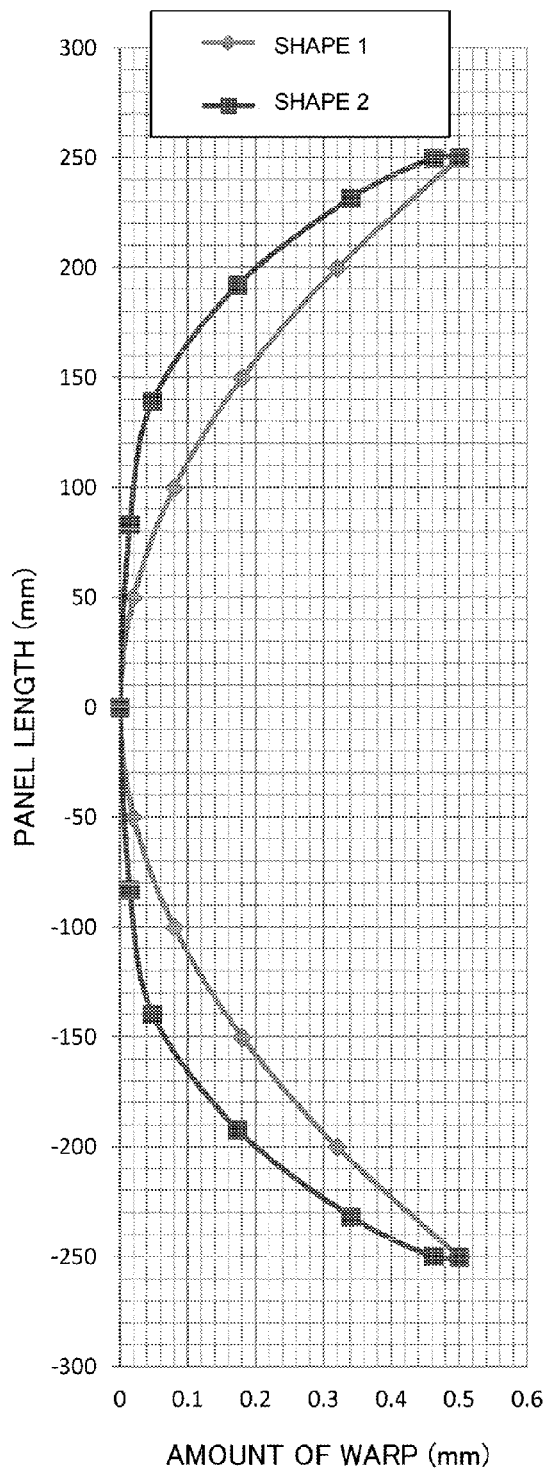
FIG. 18 illustrates examples of shape of the warp of the display panel.

For example, the maximum amount of the warp that can occur in a shape of the warp of the display panel differs according to the specification of the display panel. With a larger amount of the maximum warp, the length of the front elastic body (central portion) may be made longer or the ratio of length of the front elastic body (central portion) to the length of the side on which the front elastic body is disposed (hereinafter referred to as total length of panel) may be made greater, and hence it is possible to preferably suppress the display unevenness. Further, for example, with a smaller clearance (space) between the display panel and the panel holder, the length of the front elastic body (central portion) may be made longer or the ratio of the length of the front elastic body to the total length of the panel may be made greater, and hence it is possible to preferably suppress the display unevenness. Further, for example, with a larger size of the display panel (with a longer total length of panel), the length of the front elastic body (central portion) may be made longer or the ratio of the length of the front elastic body to the total length of the panel may be made greater, and hence it is possible to preferably suppress the display unevenness. In addition, as shown, for example, in FIG. 18, the position where the curvature largely changes differs according to the shape of the warp. FIG. 18 schematically shows two different shapes of warp. The horizontal axis represents the warp amount of the panel in its maximum warp state, and the vertical axis represents the panel length. The coordinate system of the vertical axis represents the distance from the central portion of the long side of the panel, and in the example of FIG. 18, the total length of the panel is 500 mm, and the maximum value of the amount of the warp of the panel is 0.5 mm. In the example of FIG. 18, the shape 2, compared with the shape 1, has the positions where the curvature largely changes respectively positioned close to the both end portions of the display panel. As the positions where the curvature largely changes are respectively closer to the both end portions of the display panel, the length of the front elastic body (central portion) may be made longer or the ratio of the length of the front elastic body to the total length of the panel may be made greater, and hence it is possible to preferably suppress the display unevenness.

Through examination of the specification, the shape of warp, and the like of the various display panels, it has been found that the ratio of the length $l_1$ of the front elastic body (central portion) to the total length of the panel is preferably approximately 60±10%, and at least 50% or greater. Further, the upper limit is preferably of the order not exceeding 80%. When the ratio of the length $l_1$ of the front elastic body (central portion) to the total length of the panel was greater than 80%, the effect of reducing the display unevenness was not likely to be sufficiently obtained. In addition, when the ratio of the length $l_1$ of the front elastic body (central portion) to the total length of the panel was less than 50%, the holding force by the panel holder to hold the display panel was not likely to be sufficient. The ratio of the length $l_1$ of the front elastic body (central portion) to the total length of the panel is preferably greater than 50% and less than 80%. More preferably, the ratio of the length $l_1$ of the front elastic body (central portion) to the total length of the panel is preferably greater than 60% and less than 80%. As described above, with a larger display panel size (total length of panel), the ratio of the length $l_1$ of the front elastic body (central portion) to the total length of the panel may preferably be made greater. For example, with the display panel of approximately 30 inches, the ratio of the length $l_1$ of the front elastic body (central portion) to the total length of the panel may be approximately 60%, and with the larger display panel, for example the panel of approximately 60 inches, the ratio of the length $l_1$ of the front elastic body (central portion) to the total length of the panel may be approximately 70%.

Hereinbelow, the specific configuration of the image display apparatus of the first embodiment will be described.

First, the panel holder 30 was formed by resin molding with PC/ABS used as the material. The frame 10 was formed by press molding with SECC used as the material, and the thickness thereof was set to 1 mm. A rubber cushion was used as the material of the back elastic bodies 32, the back elastic bodies 32 were bonded to four sides using the panel holder 30 and a double-sided tape, and the thickness and the width thereof were set to 3 mm and 3 mm, respectively. The clearance between the frame 10 and the display panel 20 was set to 2 mm. A flexible foaming cushioning material was adopted as the material of the front elastic bodies, the thickness of the front elastic body (central portion) 101 was set to 3 mm, the thickness of the front elastic body (both end portion) 102 was set to 2.5 mm, and the width of each of the front elastic bodies 101 and 102 was set to 3 mm. With this, the compression ratio of the front elastic body (central portion) 101 was set to 33.3%, the compression ratio of the front elastic body (both end portion) 102 was set to 20%, the pressing force in the central portion in the longitudinal direction of the display panel was set to a large value, and the pressing force in the both end portion was set to a small value. As the material of the front elastic body, a material having properties close to those of the material A shown in FIG. 7 was used. As the display panel, the display panel having the display unevenness generation stress of about $3 \times 10^{-3}$ MPa was used. In this display panel, it is assumed that the warps having the maximum warp amount of 0.5 mm occur at the four corners. The compression ratio (maximum compression ratio) of the front elastic body (both end portion) 102 was set at 40% when the warp in its maximum warp amount occurs in the display panel. In such a case, by setting the length $l_1$ of the front elastic body (central portion) at 31.6 mm and the length $l_2$ of the front elastic body (both end portion) at 92 mm, the pressing force to the display panel could be made uniform even when the warp occurred in the panel. In this case, the ratio of the length $l_1$ of the front elastic body (central portion) to the total length of the panel was approximately 63%.

In the first embodiment, in a normal state where the warp does not occur in or the external force is not exerted on the display panel of the image display apparatus, the pressing force of the front elastic body in the central portion in the longitudinal direction of the display panel is increased, and the pressing force of the front elastic body in the both end portion is reduced. With this, in a case where the warp occurs in or the external force is exerted on the both end portion of the display panel, it is possible to suppress a large stress generated in the both end portion of the display panel to reduce the display unevenness.

Note that the first embodiment has described the configuration in which the panel pressing force of the front elastic body in the normal state in the central portion in the longitudinal direction of the display panel is made different from that in the both end portion therein. However, a difference in the compression ratio of the front elastic body between the central portion and the both end portion due to the warp of the display panel occurs also in the lateral direction of the display panel. Accordingly, the front elastic bodies may also be set such that the panel pressing force in the normal state in the both end portion is smaller than that in the central portion also in the lateral direction of the display panel. Further, it is possible to suppress a large stress generated in the both end portion of the display panel to reduce the display unevenness when the pressuring force of the front elastic body in the both end portion is smaller than the pressuring force of the front elastic body in the central portion in a state where the warp is smaller than the warp in its maximum warp state in the display panel of the image display apparatus. The normal state is the state where the warp is smaller than the state where the warp in its maximum warp amount occurs in the display panel, and the normal state may include, for example, the state where substantially no warp is present. It is also considered that there is a case where the pressuring force varies in each of the front elastic body in the central portion and the front elastic bodies in the both end portions according to the positions. In such a case, the average value or the maximum value of the pressuring force by the front elastic body in the central portion may be made less than the average value or the maximum value of the pressuring force by the front elastic body in the both end portion.

Second Embodiment

Next, a second embodiment of the present invention will be described with reference to the drawings. In the second embodiment, the configuration different from that of the first embodiment will be described in detail.

Figure 8:
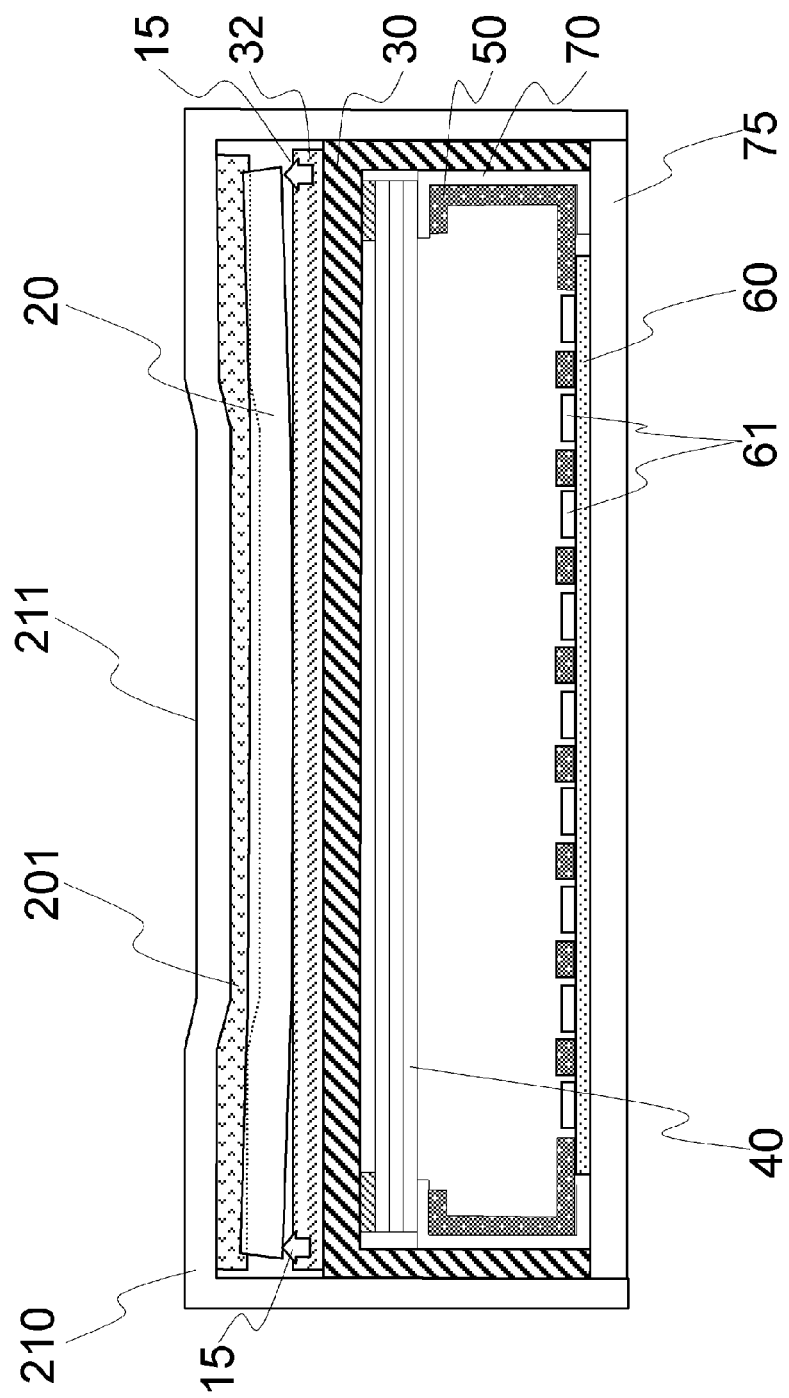
FIG. 8 is a cross-sectional view similar to the A-A cross section of FIG. 2 showing an upper side of an image display apparatus of a second embodiment.

FIG. 8 is a cross-sectional view similar to the A-A cross section of FIG. 2 schematically showing an upper side of an image display apparatus according to the second embodiment.

As shown in FIG. 8, a drawn portion 211 is provided at the center in the longitudinal direction of a frame 210. Similarly to the first embodiment, metal is often used as the material of the frame 210, and the frame 210 is formed by press working or machining. However, the frame 210 may also be formed by resin molding. The thickness of a front elastic body 201 is uniform, and the material of the front elastic body 201 is the same as that in the first embodiment. However, the pressing force to the display panel 20 in the central portion provided with the drawn portion 211 is larger than that in the both end portion correspondingly to the drawing height of the drawn portion 211. The set value of the drawing height depends on the clearance between the frame 210 and the display panel 20 and the thickness of the front elastic body, and is preferably about 0.1 to 3 mm. In addition, the length of the drawn portion 211 in the longitudinal direction of the frame 210 is preferably set to a length substantially equal to the length $l_1$ of the front elastic body (central portion) 101 of the first embodiment.

Hereinbelow, the specific configuration of the image display apparatus of the second embodiment will be described.

As the configuration of the frame 210, the frame 210 was formed by press molding with SECC used as the material, and the thickness thereof was set to 1 mm. The clearance between the frame 210 and the display panel 20 was set to 2 mm, and the drawing height was set to 0.5 mm, i.e., the clearance between the drawn portion 211 and the display panel 20 was set to 1.5 mm. The foaming cushioning material was used as the material of the front elastic body, and the thickness of the front elastic body 201 was set to 2.5 mm. With this, the compression ratio of the front elastic body 201 was set to 40% in the drawn portion 211, the compression ratio thereof was set to 20% in the other portions, the pressing force in the central portion in the longitudinal direction of the display panel was increased, and the pressing force in the both end portion was reduced.

With the configuration of the second embodiment, it becomes unnecessary to divide the front elastic body for making the thickness thereof in the central portion different from that in the both end portion. According to the image display apparatus of the second embodiment, in the normal state, it is possible to increase the pressing force of the front elastic body in the central portion in the longitudinal direction of the display panel, and reduce the pressing force of the front elastic body in the both end portion. With this, in the case where the warp occurs in or the external force is exerted on the display panel, it is possible to lessen the stress generated in the display panel to reduce the display unevenness.

Third Embodiment

Next, a third embodiment of the present invention will be described with reference to the drawings. In the third embodiment, the configuration different from that of the first embodiment will be described in detail.

Figure 9:
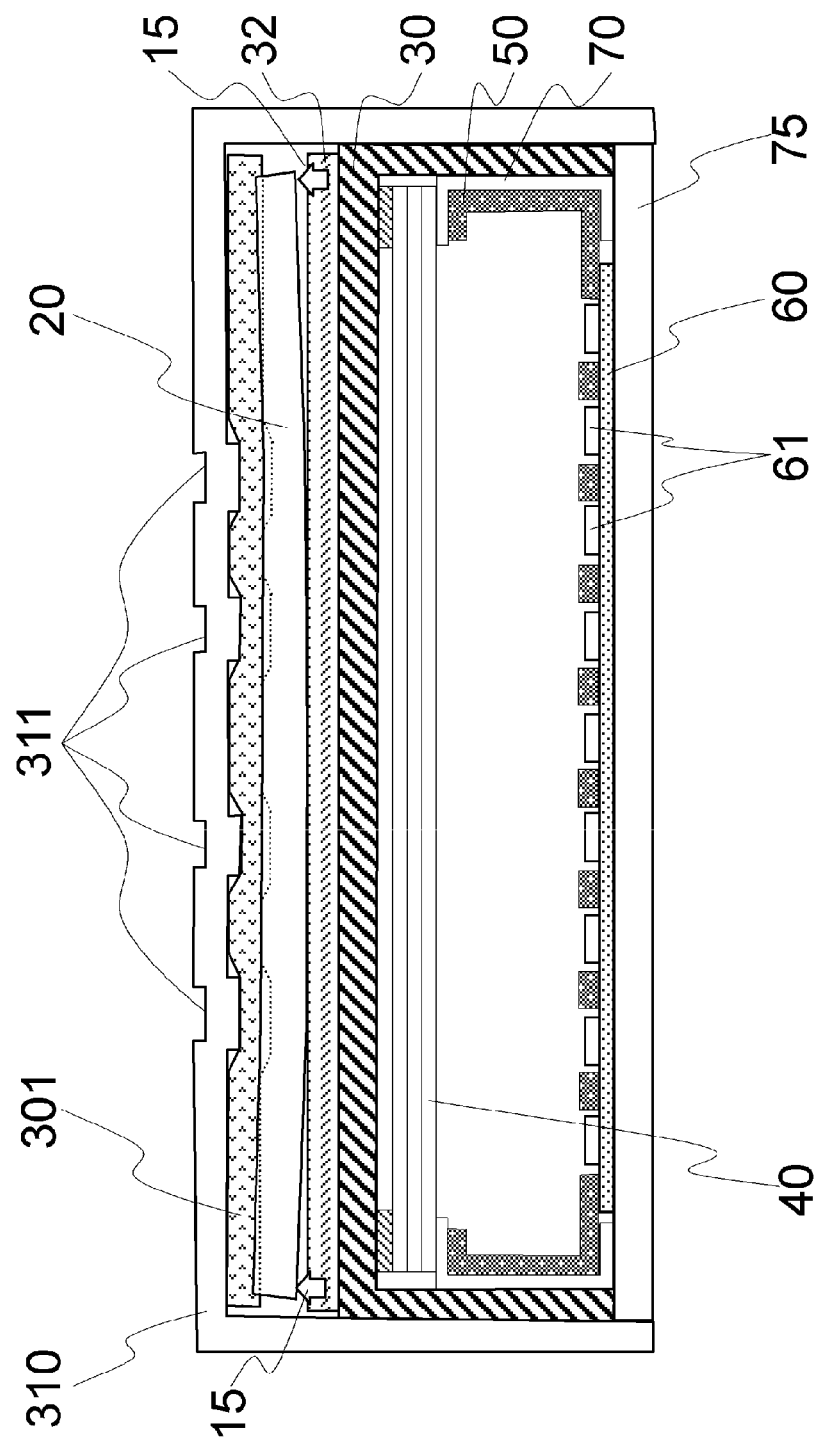
FIG. 9 is a cross-sectional view similar to the A-A cross section of FIG. 2 showing an upper side of an image display apparatus of a third embodiment.

FIG. 9 is a cross-sectional view similar to the A-A cross section of FIG. 2 schematically showing an upper side of an image display apparatus according to the third embodiment.

As shown in FIG. 9, at least one half-pierced portion 311 as a protruded portion protruded toward the display panel 20 is provided in a portion in the vicinity of the center in the longitudinal direction of a frame 310. The position of the half-pierced portion 311 and the number thereof can be determined according to the specifications of the display panel 20 and the frame 310. The frame 310 is formed by press working or machining by using metal as the material. The frame 310 may also be formed into a shape similar to the half-pierced portion 311 by resin molding, and the half-pierced portion may be constituted by another member instead of being formed integrally with the frame. Although the thickness of a front elastic body 301 is uniform, and the material thereof is the same as that of the first embodiment, the pressing force to the display panel 20 in the central portion provided with the half-pierced portion 311 is partially larger than that in the both end portion that is not provided with the half-pierced portion 311 correspondingly to the height of the half-pierced portion 311. The height of the half-pierced portion 311 depends on the clearance between the frame 310 and the display panel 20 and the thickness of the front elastic body, and is preferably about 0.1 to 3 mm. In addition, the length of the portion where the half-pierced portion 311 is provided in the longitudinal direction of the frame 310 is preferably set to a length substantially equal to the length $l_1$ of the front elastic body (central portion) 101 of the first embodiment. The position, the number, the thickness, and the length in the longitudinal direction of the display panel of the half-pierced portion 311 in a region where the half-pierced portion 311 is disposed are determined according to the specifications of the display panel, characteristics of the warp, the properties of the front elastic body, and the size of the display panel. They are also determined on the basis of the capability to hold the panel in the normal state and the requirement for uniformity of the panel pressing forces of the front elastic body in the central portion and the both end portion in the longitudinal direction in a state where the panel is warped. With the configuration of the third embodiment, portions where the pressing force to the display panel 20 is increased can be disposed discretely, and an efficient holding structure is allowed.

With the configuration of the third embodiment, even the configuration that does not divide the front elastic body and does not use a large die such as the drawing shape can increase the pressing force in the central portion in the longitudinal direction of the display panel and reduce the pressing force in the both end portion. With this, it is possible to suppress the stress generated in the display panel when the warp occurs in the display panel to reduce the display unevenness.

Fourth Embodiment

Next, a fourth embodiment of the present invention will be described with reference to the drawings. In the fourth embodiment, the configuration different from that of the first embodiment will be described in detail.

Figure 10:
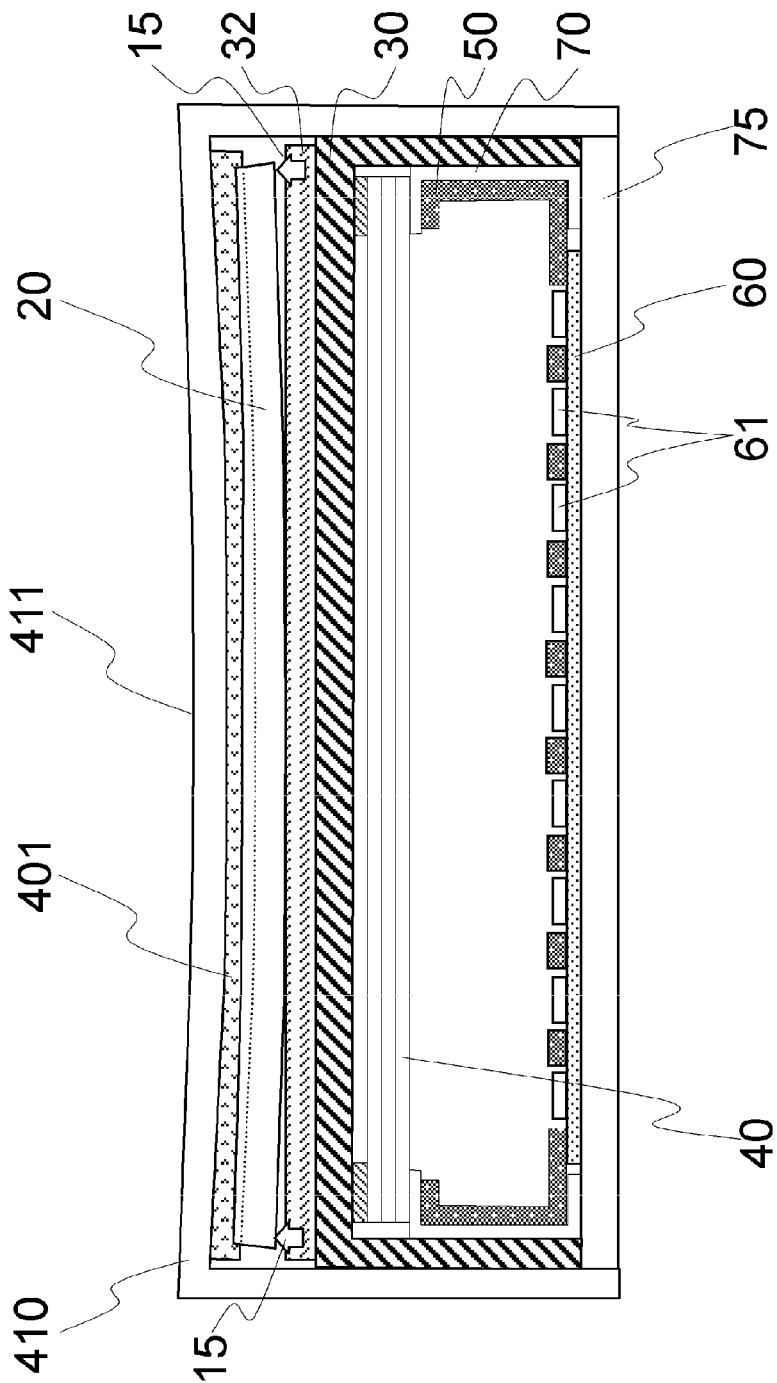
FIG. 10 is a cross-sectional view similar to the A-A cross section of FIG. 2 showing an upper side of an image display apparatus of a fourth embodiment.

FIG. 10 is a cross-sectional view similar to the A-A cross section of FIG. 2 schematically showing an upper side of an image display apparatus according to the fourth embodiment.

As shown in FIG. 10, a curved portion 411 is provided at the center in the longitudinal direction of a frame 410. Similarly to the first embodiment, metal is often used as the material of the frame 410, and the frame 410 is formed by press working or machining. However, the frame 410 may also be formed by resin molding. The thickness of a front elastic body 401 is uniform, and the material of the front elastic body 401 is the same as that in the first embodiment. However, the pressing force to the display panel 20 in the central portion in the longitudinal direction provided with the curved portion 411 of the frame 410 is larger than that in the both end portion in the longitudinal direction correspondingly to the curved shape. The amount of protrusion toward the display panel caused by the curved shape depends on the clearance between the frame 410 and the display panel 20 and the thickness of the front elastic body, and is preferably about 0.1 to 3 mm. It is most effective to make the curved shape identical with the shape of the maximum warp of the display panel 20 in terms of the effect of suppressing the stress generated in the panel when the panel is warped.

With the configuration of the fourth embodiment, by forming the frame into the curved shape corresponding to the shape of the maximum warp of the display panel, the pressing force in the longitudinal direction of the display panel becomes uniform when the warp occurs in the display panel. With this, it is possible to lessen the stress generated in the display panel when the warp occurs in the display panel to reduce the display unevenness.

Fifth Embodiment

Next, a fifth embodiment of the present invention will be described with reference to the drawings.

Figure 11:
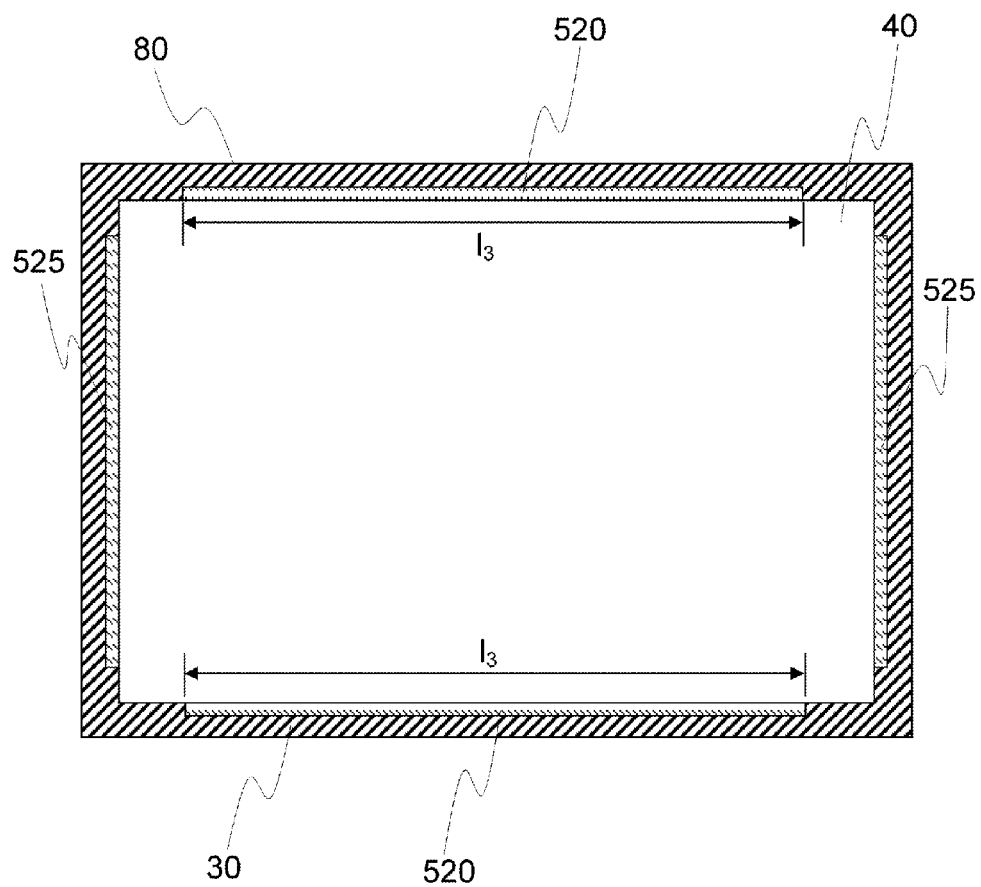
FIG. 11 is a front view showing a backlight unit of a fifth embodiment.
Figure 12:
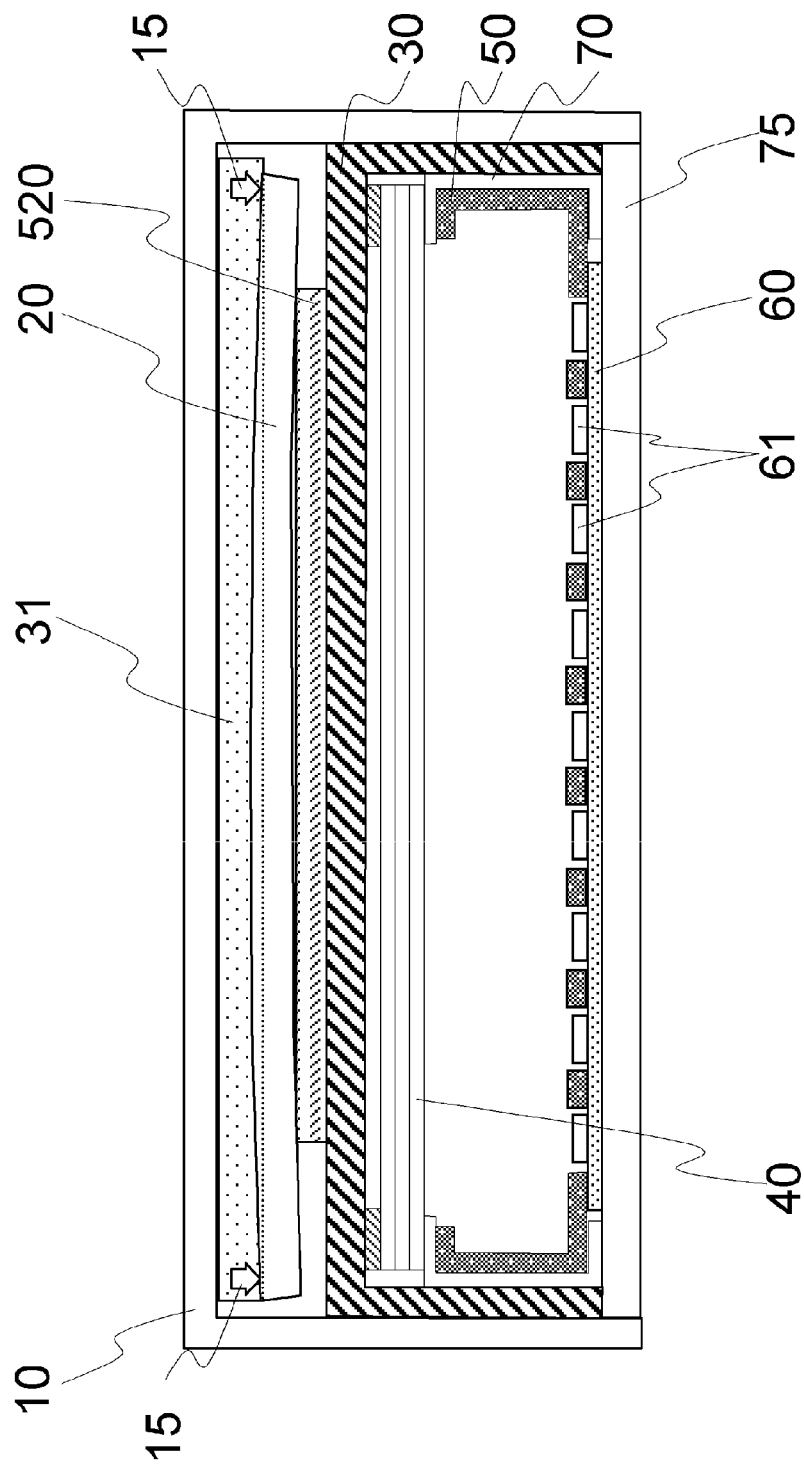
FIG. 12 is a cross-sectional view similar to the A-A cross section of FIG. 2 showing an upper side of an image display apparatus of the fifth embodiment.

FIG. 11 is a front view schematically showing a backlight unit according to the fifth embodiment. FIG. 12 is a cross-sectional view similar to the A-A cross section of FIG. 2 schematically showing an upper side of an image display apparatus according to the fifth embodiment.

The present configuration is effective at suppressing the display unevenness in a state where the display panel 20 is warped to the side of the back surface at four corners. FIG. 11 shows the backlight unit 80, and back elastic bodies 520 are disposed in the longitudinal direction of the panel holder 30, and back elastic bodies (side portions) 525 are disposed in the lateral direction thereof. The back elastic body is not disposed in the both end portion of each of the four corners. Similarly to the first embodiment, the rubber cushion is preferable as the material of the back elastic body, but the foaming cushioning material used for the front elastic body may also be used. In a case where the back elastic body 520 is disposed in the both end portion, the pressing force to the display panel in the both end portion is increased when warps 15 occur, due to the compression relationship with a front elastic body 31. Consequently, a configuration is adopted in which the back elastic body is not disposed in the both end portion, and the pressing force in the both end portion is thereby reduced. The warp state of the display panel 20 is calculated or measured in advance, and a length $l_3$ of the back elastic body 520 is determined on the basis of the calculated or measured warp state. For example, the length $l_3$ of the back elastic body 520 is determined on the basis of a range in which the amount of warp toward the back surface is smaller than a threshold value. Further, by using the configurations of the first to fourth embodiments as the configurations of the frame 10 and the front elastic body 31, it is also possible to implement a configuration that copes with both of a case where the display panel is warped to the side of the front surface and a case where the display panel is warped to the side of the back surface.

With the configuration of the fifth embodiment, the pressing force in the central portion in the longitudinal direction of the display panel is increased and the pressing force in the both end portion is lost, and hence, even when the four corners of the display panel are warped to the side of the back surface, it is possible to lessen the stress generated in the display panel to reduce the display unevenness.

Sixth Embodiment

Next, a sixth embodiment of the present invention will be described with reference to the drawings.

Figure 13:
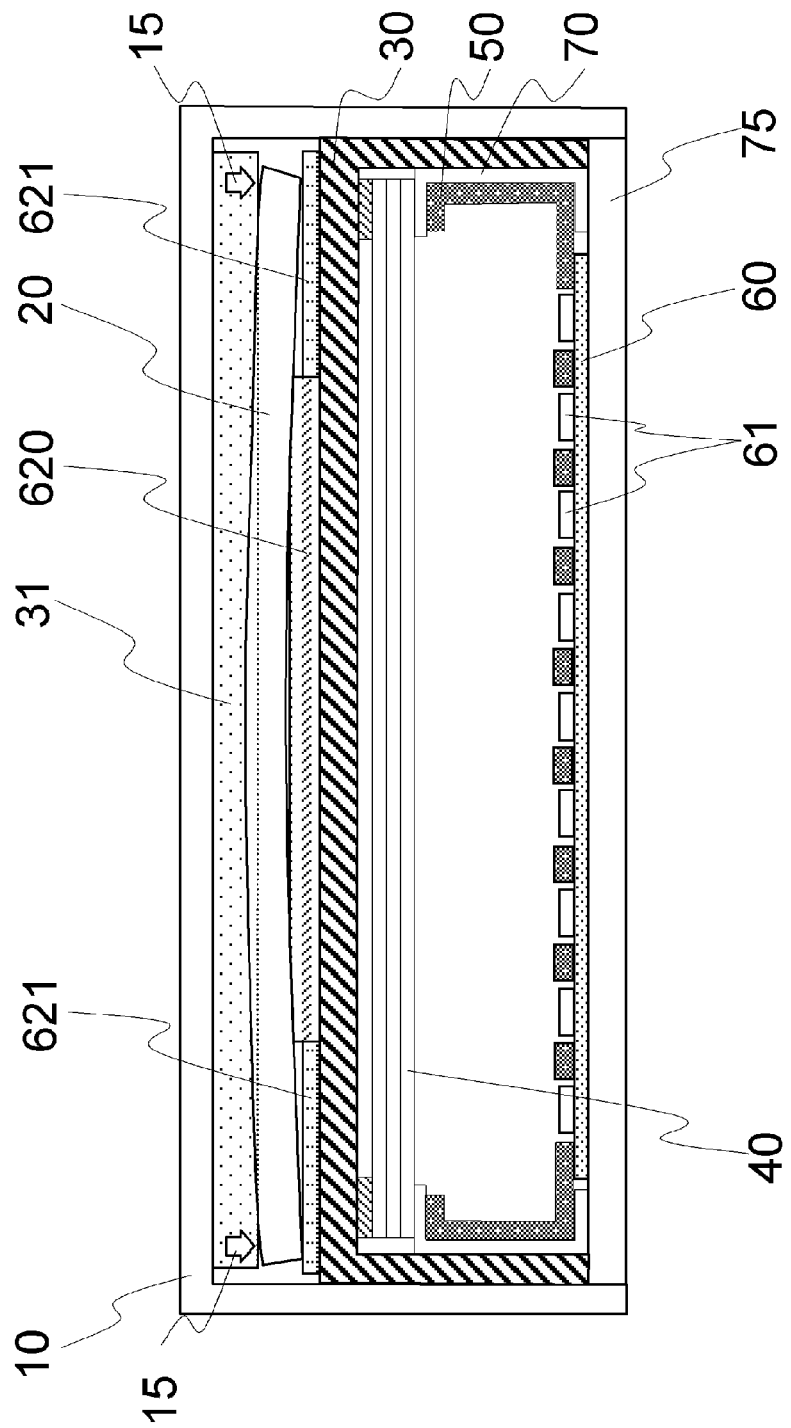
FIG. 13 is a cross-sectional view similar to the A-A cross section of FIG. 2 showing an upper side of an image display apparatus of a sixth embodiment.

FIG. 13 is a cross-sectional view similar to the A-A cross section of FIG. 2 schematically showing an upper side of an image display apparatus according to the sixth embodiment. In the sixth embodiment, the configuration different from that of the fifth embodiment will be described in detail.

The present configuration is effective in a state where the display panel 20 is warped to the side of the back surface at four corners. As shown in FIG. 13, a back elastic body (central portion) 620 is disposed in the central portion in the longitudinal direction of the panel holder 30, and back elastic bodies (both end portions) 621 are disposed in the both end portions. The back elastic body (central portion) 620 is made thicker than the both end portion to make the compression ratio and the compression force uniform, and the back elastic body (both end portion) 621 is made thinner than the central portion while maintaining the holding force of the display panel 20. With this, it is possible to reduce the compression ratio and the compression force of the back elastic body (both end portion) when the four corners of the display panel are warped to the side of the back surface, and it is possible to lessen the stress generated in the display panel to reduce the display unevenness. The material of the back elastic body is the same as that in the fifth embodiment. The thickness of each of the back elastic bodies 620 and 621 is preferably in a range of 0.5 to 5 mm. Further, by using the configurations of the first to fourth embodiments as the configurations of the frame 10 and the front elastic body 31, it is possible to implement the configuration that copes with the case where the display panel is warped to the side of the front surface and the case where the display panel is warped to the side of the back surface.

With the configuration of the sixth embodiment, the pressing force in the central portion in the longitudinal direction of the display panel is increased and the pressing force in the both end portion is reduced, and hence, even when the four corners of the display panel are warped to the side of the back surface, it is possible to lessen the stress generated in the display panel to reduce the display unevenness.

Seventh Embodiment

Next, a seventh embodiment of the present invention will be described with reference to the drawings.

Figure 14:
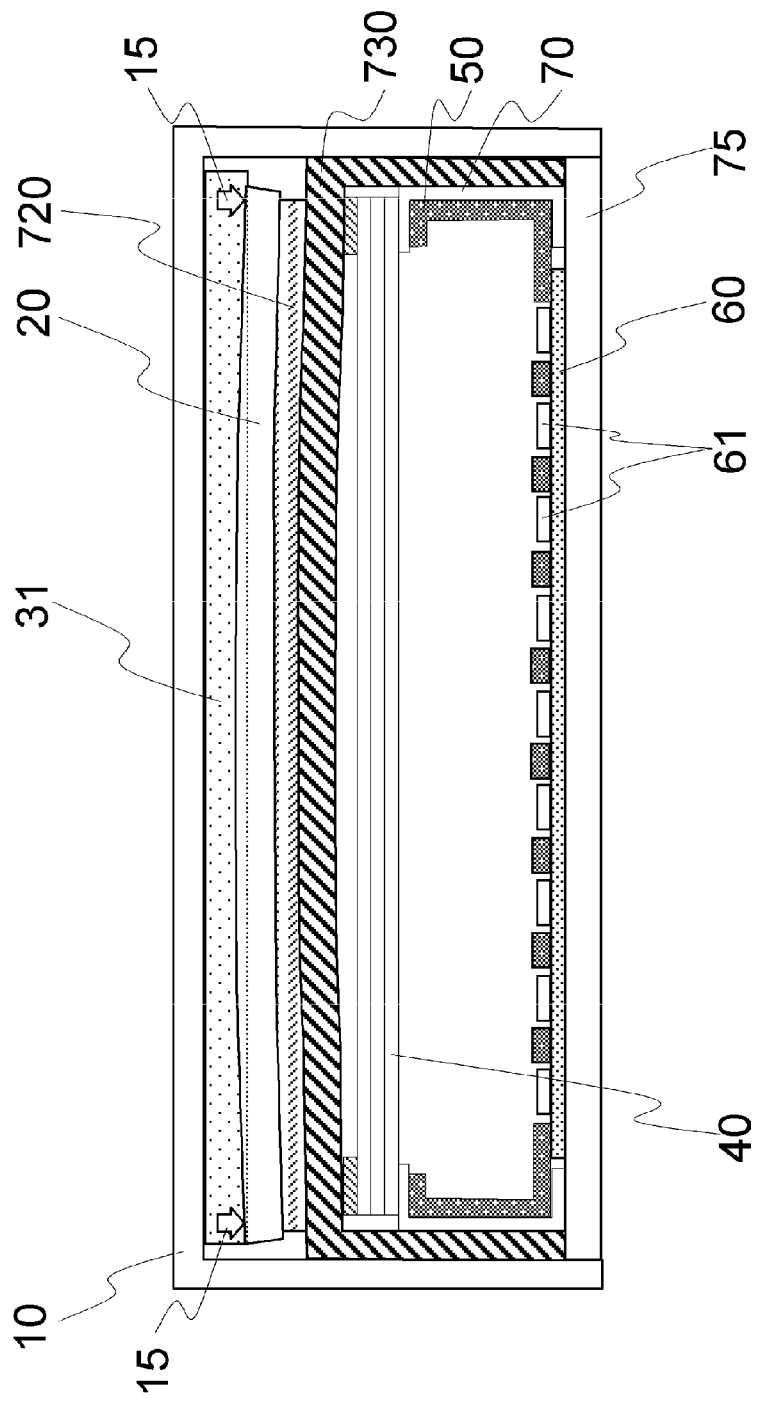
FIG. 14 is a cross-sectional view similar to the A-A cross section of FIG. 2 showing an upper side of an image display apparatus of a seventh embodiment.
Figure 15:
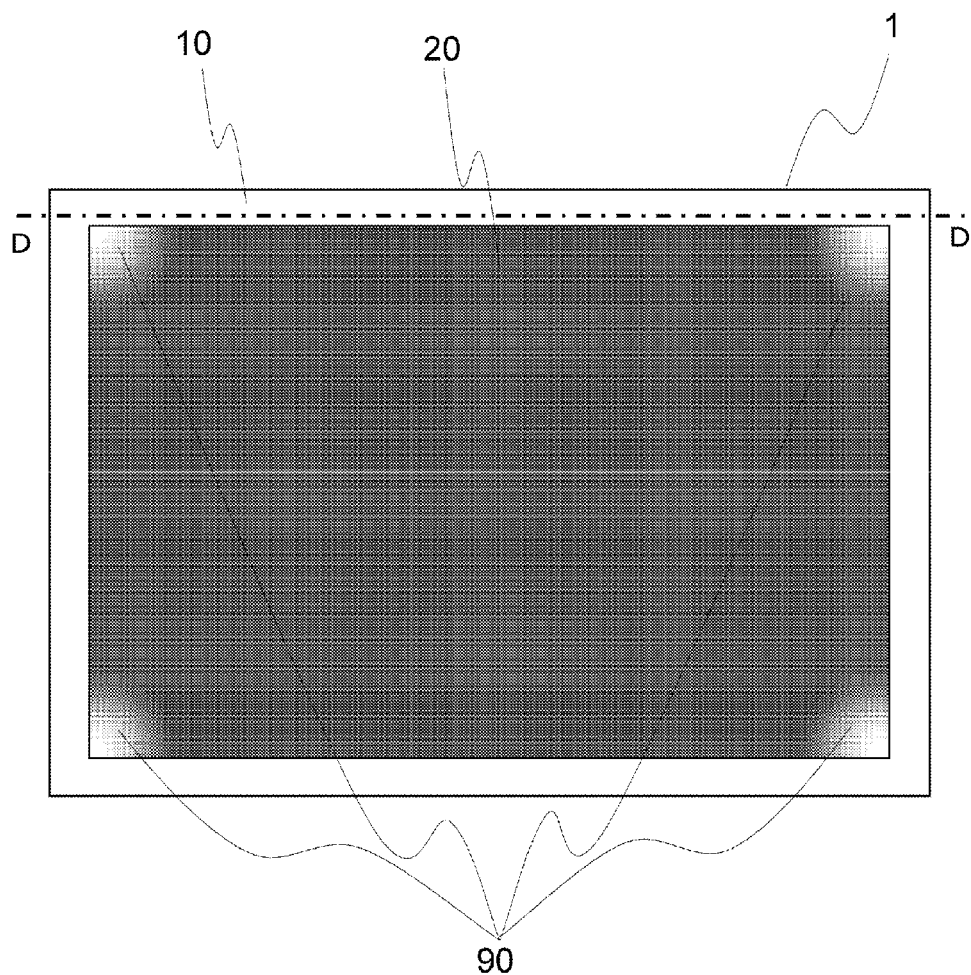
FIG. 15 is a front view showing a state where display unevenness occurs in a conventional image display apparatus.
Figure 16:
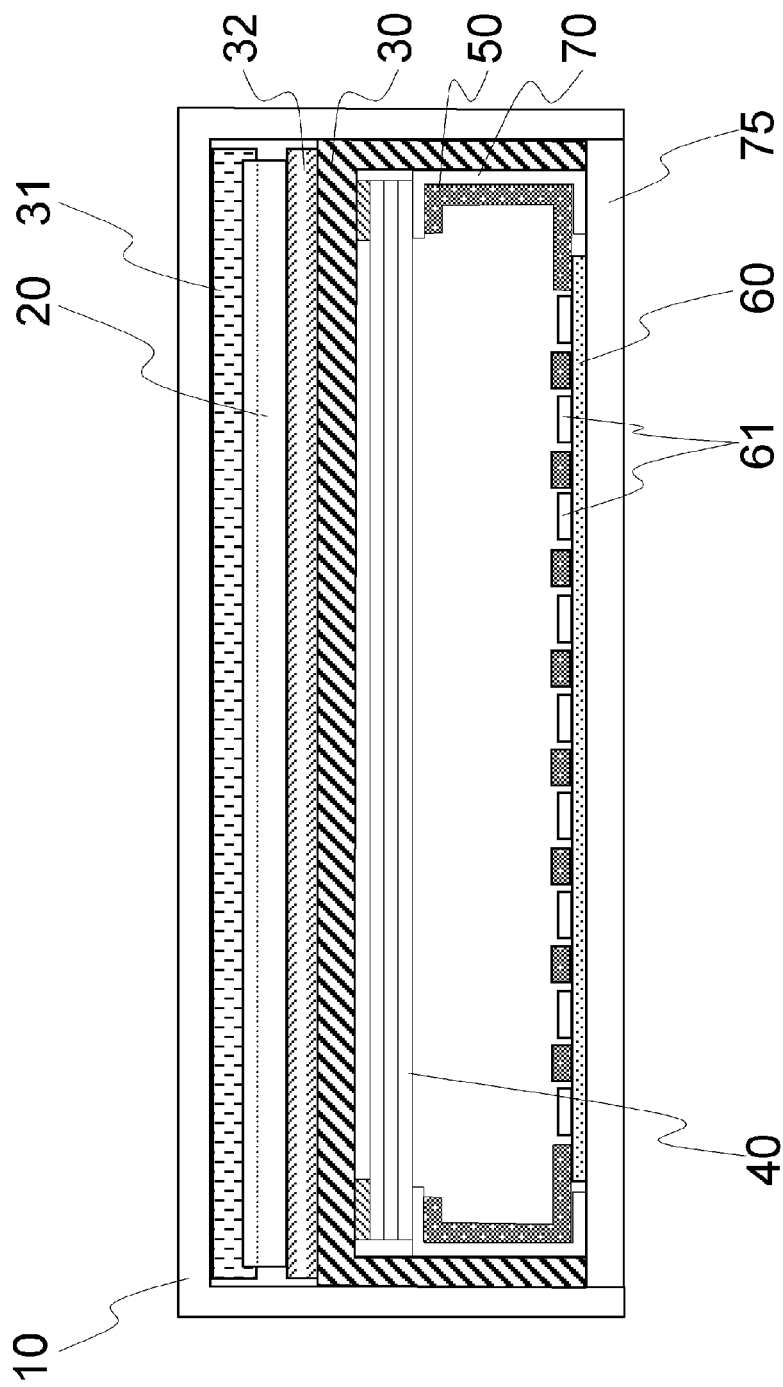
FIG. 16 is a D-D cross-sectional view of FIG. 15 showing a state where the warp of a display panel is not present.
Figure 17:
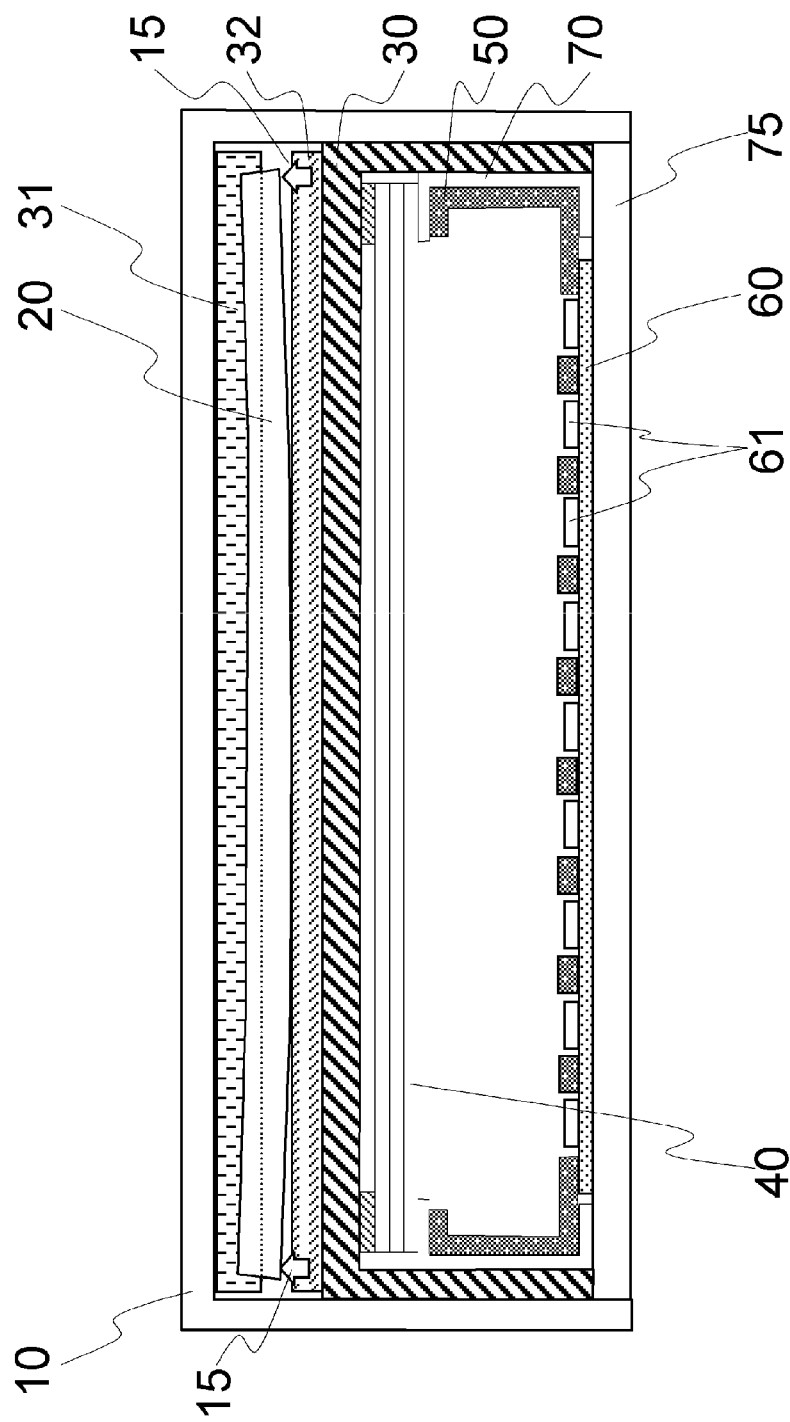
FIG. 17 is a D-D cross-sectional view of FIG. 15 showing a state where the warp of the display panel is present.

FIG. 14 is a cross-sectional view similar to the A-A cross section of FIG. 2 schematically showing an upper side of an image display apparatus according to the seventh embodiment. In the seventh embodiment, the configuration different from that of the fifth embodiment will be described in detail.

The present configuration is effective in a state where the display panel 20 is warped to the side of the back surface at the four corners. As shown in FIG. 14, in the seventh embodiment, a panel holder 730 is formed into a shape in which the central portion in the longitudinal direction is close to the display panel 20. This shape depends on the clearance between the panel holder 730 and the display panel 20 and the thickness of the back elastic body, and the amount of protrusion toward the display panel 20 in the central portion is preferably about 0.1 to 3 mm. In addition, it is most effective to make the shape of the panel holder 730 identical with the shape of the display panel 20 in its maximum warp state in terms of the effect of reducing the display unevenness when the display panel 20 is warped. With this, even when the warp occurs in the display panel 20, it is possible to provide the same compression ratio and the same compression force in the central portion and the both end portion of the back elastic body 720. Further, by using the configurations of the first to fourth embodiments as the configurations of the frame 10 and the front elastic body 31, it is also possible to implement the configuration that copes with both of the case where the display panel is warped to the side of the front surface and the case where the display panel is warped to the side of the back surface.

With the configuration of the seventh embodiment, even when the four corners of the display panel are warped to the side of the back surface, the pressing force in the longitudinal direction of the display panel is made uniform, and hence it is possible to lessen the stress generated in the display panel to reduce the display unevenness.

In each of the embodiments described above, the example has been described in which, with regard to the front elastic body, the pressing force in the normal state in the central portion in the longitudinal direction of the display panel is made larger than that in the both end portion, and the portion in the lateral direction of the display panel is not divided into the central portion and the both end portion, and has the same configuration as that of the both end portion in the longitudinal direction over its entire length. However, the pressing force in the normal state in the central portion in the lateral direction of the display panel may be made different from that in the both end portion, and the portion in the longitudinal direction of the display panel may not be divided into the central portion and the both end portion, and may have the same configuration as that of the both end portion in the lateral direction over its entire length. In addition, the pressing force in the normal state in the central portion may be made larger than that in the both end portion in the longitudinal direction and in the lateral direction. When the pressing force in the normal state in the central portion is made larger than that in the both end portion in at least one of the longitudinal direction and the lateral direction, it is possible to lessen the stress generated in the display panel when the display panel is warped to obtain the effect of suppressing the display unevenness. In addition, the configuration of the front elastic body described above may be applied to the back elastic body without being altered.

In each of the embodiments described above, the example has been described in which, with regard to the back elastic body, the elastic body is provided only in the central portion and is not provided in the both end portion in both of the longitudinal direction and the lateral direction of the display panel. However, the elastic body may not be provided in the both end portion only in the longitudinal direction, and the elastic body may be provided over the entire length in the lateral direction. Conversely, the elastic body may not be provided in the peripheral direction only in the lateral direction, and the elastic body may be provided over the entire length in the longitudinal direction. By not providing the elastic body in the both end portion in at least one of the longitudinal direction and the lateral direction, it is possible to lessen the stress generated in the display panel when the display panel is warped to obtain the effect of suppressing the display unevenness. The configuration of the back elastic body described above may be applied to the front elastic body without being altered. However, the front elastic body has the functions of preventing the entry of foreign objects such as dust and the like from the outside environment into the image display apparatus and preventing the leakage of light from the image display apparatus, and hence it is preferable to provide the front elastic body over the entire periphery without any notch.

As the configuration for making the pressing force from the front elastic body or the back elastic body to the display panel in the central portion larger than that in the both end portion in the normal state, the configuration in which the distance between the elastic body and the display panel in the normal state is changed has been shown as an example. However, as the configuration for making the pressing force from the front elastic body or the back elastic body to the display panel in the central portion larger than that in the both end portion in the normal state, it is also possible to adopt a configuration in which elastic properties of the elastic body in the central portion is made different from those in the both end portion. For example, the properties (quality of the material) in the central portion may be made different from those in the both end portion such that the compression force (i.e., the pressing force to the display panel) is different between the central portion and the both end portion even when the compression ratio is the same. In this case, the thickness of the elastic body can be made uniform over the entire periphery. When the thickness of the elastic body is uniform over the entire periphery, the compression ratio in the both end portion becomes larger than that in the central portion when the display panel is warped. However, if the properties of the elastic bodies in the central portion and the both end portion are chosen such that the compression force generated at the same compression ratio becomes smaller in the both end portion than in the central portion, it is possible to suppress a large stress generated in the four corners of the display panel when the display panel is warped, and hence it is possible to suppress the display unevenness.

Thus, according to the present invention, in the normal state of the image display apparatus, by increasing the pressing force in the central portion in the longitudinal direction of the display panel and reducing the pressing force in the both end portion, it is possible to lessen the stress generated in the display panel when the warp occurs in or the external force is exerted on the display panel to reduce the display unevenness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-030157, filed on Feb. 19, 2013, and Japanese Patent Application No. 2014-025663, filed on Feb. 13, 2014, which are hereby incorporated by reference herein in their entirety.

What is claimed is:

1. An image display apparatus comprising:
a display panel;
a holding member that holds four sides of the display panel; and
a cushioning member that is disposed between the display panel and the holding member and exerts pressing force corresponding to deformation amount on the display panel, wherein
the pressing force exerted on the display panel from the cushioning member in a region at each of both end portions of at least one of the four sides of the display panel is smaller than the pressing force exerted on the display panel from the cushioning member in a region at a central portion of the side in a state where a warp present in the display panel is smaller than the warp in its maximum warp state.

2. The image display apparatus according to claim 1, wherein
a thickness of the cushioning member in the region at each of both end portions of the side is smaller than a thickness of the cushioning member in the region at the central portion of the side.

3. The image display apparatus according to claim 1, wherein
a shape and a physical property of the cushioning member and a shape of the holding member are determined on the basis of a characteristic of the warp of the display panel caused by an environmental condition or a use condition.

4. The image display apparatus according to claim 1, wherein
a shape and a physical property of the cushioning member and a shape of the holding member are determined such that the pressing force exerted on the display panel from the cushioning member is smaller than a threshold value in a state where the warp is present in the display panel due to an environmental condition or a use condition.

5. The image display apparatus according to claim 1, wherein
the holding member is a frame that holds the display panel from the front, and
wherein the cushioning member is a front elastic body that is disposed between the display panel and the frame.

6. An image display apparatus comprising:
a display panel;
a holding member that holds a plurality of sides of the display panel; and
a cushioning member that is disposed between the display panel and the holding member,
wherein a pressing force against the display panel from the cushioning member in a region at each of both end portions of a first side, which is one of the plurality of sides of the display panel, is smaller than a pressing force against the display panel from the cushioning member in a region at a central portion of the first side.

7. The image display apparatus according to claim 6, wherein a thickness of the cushioning member in a direction approximately perpendicular to a display surface of the display panel in the region at each of both end portions of the first side is smaller than a thickness of the cushioning member in a direction approximately perpendicular to a display surface of the display panel in the region at the central portion of the first side.

8. The image display apparatus according to claim 6, wherein, in a case where a deformation amount in both end portion regions is equal to a deformation amount in the central portion region, the pressing force against the display panel from the cushioning member in the region at each of both end portions of the first side is smaller than the pressing force against the display panel from the cushioning member in the region at the central portion of the first side.

9. The image display apparatus according to claim 6, wherein the holding member is shaped such that a distance between the display panel and the holding member in the region at each of both end portions of the first side is longer than a distance between the display panel and the holding member in the region at the central portion of the first side.

10. The image display apparatus according to claim 6, wherein the holding member is shaped such that a distance between the display panel and the holding member is uniform over an entire length of the first side in a state where a warp is present in the display panel.

11. The image display apparatus according to claim 6, wherein the first side is a long side of the display panel.

12. The image display apparatus according to claim 6, wherein a shape and a physical property of the cushioning member and a shape of the holding member are determined on the basis of a characteristic of a warp of the display panel caused by an environmental condition or a use condition.

13. The image display apparatus according to claim 6, wherein a shape and a physical property of the cushioning member and a shape of the holding member are determined such that the pressing force against the display panel from the cushioning member is smaller than a threshold value in a state where a warp is present in the display panel due to an environmental condition or a use condition.

14. The image display apparatus according to claim 6, wherein the holding member is a frame that holds the display panel from the front, and
wherein the cushioning member is a front elastic body that is disposed between the display panel and the frame.

15. The image display apparatus according to claim 6, wherein the holding member is a panel holder that holds the display panel from the back, and
wherein the cushioning member is a back elastic body that is disposed between the display panel and the panel holder.

16. The image display apparatus according to claim 6, wherein the ratio of the length of the region at the central portion along the first side to the length of the side is greater than 50% and less than 80%.

17. The image display apparatus according to claim 6, wherein the value of the ratio of the length of the region at the central portion along the first side to the length of the first side becomes greater as the size of the display panel becomes larger.

18. The image display apparatus according to claim 6, wherein the value of the ratio of the length of the region at the central portion along the first side to the length of the first side becomes greater as a maximum warp amount of the display panel becomes larger.

19. The image display apparatus according to claim 6, wherein the value of the ratio of the length of the region at the central portion along the first side to the length of the first side becomes greater as the space between the display panel and the holding member becomes smaller.

20. The image display apparatus according to claim 6, wherein, under a predetermined condition, the display panel is more warped and approaches more closely to the cushioning member in the region at each of both end portions of the first side than in the region at the central portion of the first side.

21. The image display apparatus according to claim 6, wherein the cushioning member consists of a plurality of members.

22. An image display apparatus comprising:
a display panel;
a holding member that holds a plurality of sides of the display panel; and
a cushioning member that is disposed between the display panel and the holding member,
wherein a thickness of the cushioning member in a direction approximately perpendicular to a display surface of the display panel in the region at each of both end portions of a first side, which is one of the plurality of sides of the display panel, is smaller than a thickness of the cushioning member in a direction approximately perpendicular to a display surface of the display panel in the region at the central portion of the first side.

23. The image display apparatus according to claim 22, wherein the display panel is more warped to the cushioning member in the region at each of both end portions of the first side than in the region at the central portion of the first side under a predetermined condition.

24. The image display apparatus according to claim 22, wherein a shape and a physical property of the cushioning member and a shape of the holding member are determined on the basis of a characteristic of a warp of the display panel caused by an environmental condition or a use condition.

25. The image display apparatus according to claim 22, wherein a shape and a physical property of the cushioning member and a shape of the holding member are determined such that a pressing force against the display panel from the cushioning member is smaller than a threshold value in a state where a warp is present in the display panel due to an environmental condition or a use condition.

26. The image display apparatus according to claim 22, wherein the holding member is a frame that holds the display panel from the front, and
wherein the cushioning member is a front elastic body that is disposed between the display panel and the frame.

27. The image display apparatus according to claim 22, wherein the cushioning member consists of a plurality of members.

* * * * *